United States Patent [19]

Kasai et al.

[11] Patent Number: 4,903,319
[45] Date of Patent: Feb. 20, 1990

[54] PORTABLE RADIO TELEPHONE HAVING POWER SAVER

[75] Inventors: Yoshihiko Kasai; Sotoaki Babano, both of Tokyo, Japan

[73] Assignee: NEC Corporation, Tokyo, Japan

[21] Appl. No.: 77,137

[22] Filed: Jul. 23, 1987

[30] Foreign Application Priority Data

Jul. 26, 1986 [JP] Japan ................................. 61-174743

[51] Int. Cl.4 ............................................. H04B 1/16
[52] U.S. Cl. ........................................ 455/33; 379/59; 379/63; 455/127; 455/343
[58] Field of Search ...................... 379/56, 58, 59, 60, 379/61, 63; 455/33, 343, 127, 228

[56] References Cited

U.S. PATENT DOCUMENTS

| | | | |
|---|---|---|---|
| 3,962,553 | 6/1976 | Lider et al. | 379/61 |
| 4,449,248 | 5/1984 | Leslie et al. | 455/228 |
| 4,523,332 | 6/1985 | Mori | 455/228 |
| 4,631,496 | 12/1986 | Borras et al. | 455/343 |
| 4,731,814 | 3/1988 | Becker et al. | 455/127 |
| 4,736,461 | 4/1988 | Kawasaki et al. | 455/343 |

Primary Examiner—Robert Lev
Attorney, Agent, or Firm—Sughrue, Mion, Zinn, Macpeak & Seas

[57] ABSTRACT

A battery-powered portable radio telephone for use in a mobile telephone network receives signals from the network and judges from the received signal whether the radio telephone is inside or outside of the service area of the network. A battery saver is provided to periodically interrupt the battery power of the telephone when the latter is judged as being outside of the service area.

10 Claims, 5 Drawing Sheets

PORTABLE RADIO TELEPHONE HAVING POWER SAVER

BACKGROUND OF THE INVENTION

The present invention relates to a portable radio communication unit for use in a mobile switched telecommunication network.

Portable radio telephones are designed to work with the conventional cellular mobile telephone network in the same manner as automobile units are working with it. However, the current portable radio telephones are not provided with a battery saver, requiring a relatively large battery. It has been desired to provide a battery saver to minimize power consumption.

SUMMARY OF THE INVENTION

The present invention is based on the fact that the conventional portable radio telephones have a lower transmission level, typically 6 or 7 dB lower than that of the automobile telephone. The service area of the portable telephone is smaller than that of the automobile telephone and hence portable units can easily go beyond the boundary of the service area, wasting their battery power.

It is therefore an object of the present invention to provide a battery-powered portable radio communication unit for use in a mobile switched telecommunication network, wherein the telephone is provided with a battery saver for periodically interrupting battery power when the portable unit is outside of the service area of the network.

According to another one aspect of the present invention, the portable unit is provided with a battery saver that periodically interrupts the battery power is within the service area during standby modes.

BRIEF DESCRIPTION OF THE DRAWINGS

The present invention will be described in further detail with reference to the accompanying drawings, in which.

DETAILED DESCRIPTION

Figure 1:
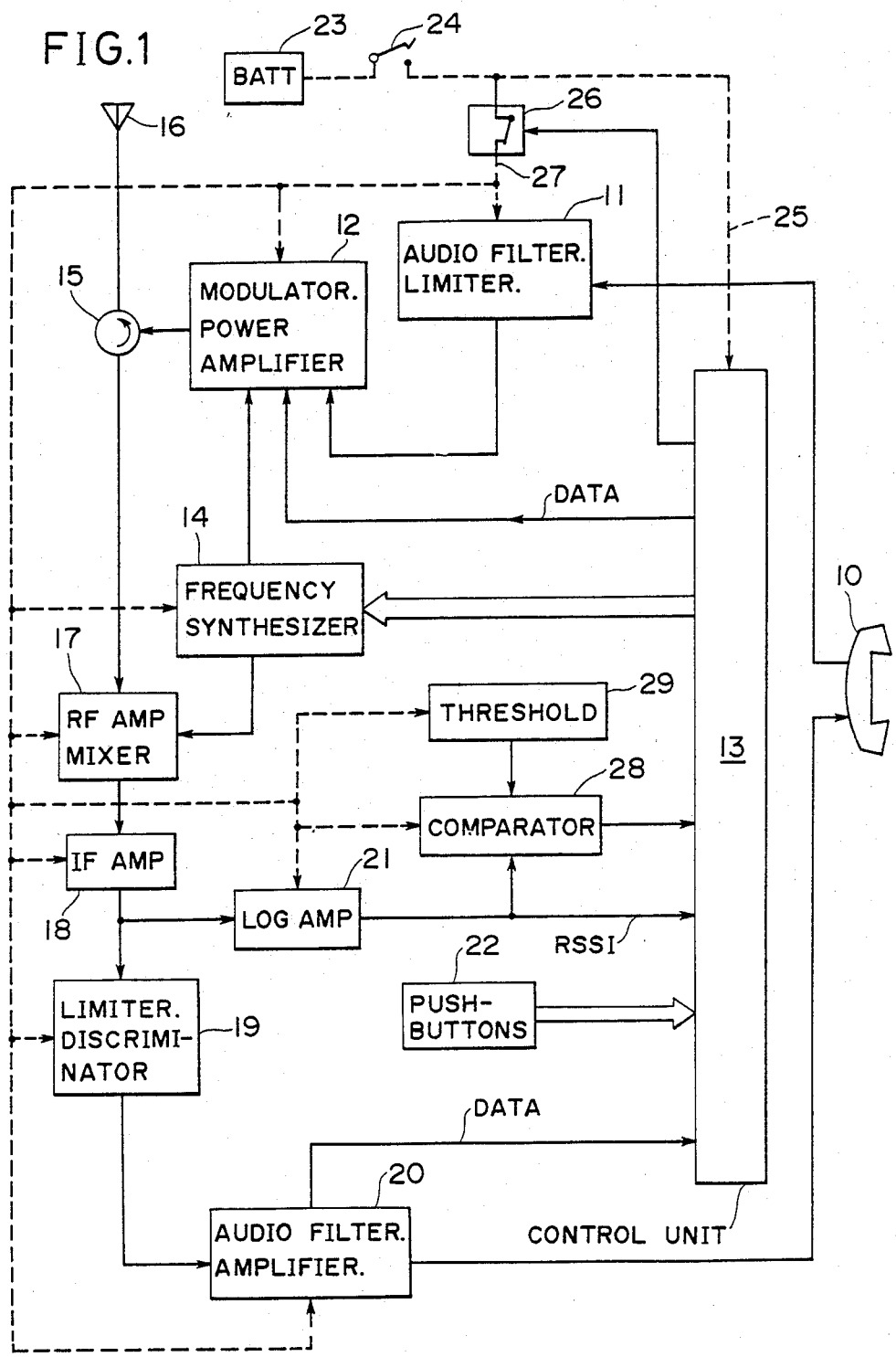
FIG. 1 is a schematic block diagram of a portable radio telephone according to the present invention.

A portable radio telephone set of the present invention shown in FIG. 1 is adapted for working to a cellular mobile telephone system currently available in the same manner as mobile units mounted on automotive vehicles. Therefore, the portable radio telephone of the invention is identical in construction to such mobile units with the exception that it includes a novel power savor circuit.

Before describing the present invention, a description will be given to portions of the portable radio telephone set which are identical to the vehicle-mounted units. In FIG. 1, a speech signal from handset 10 is applied to a circuit 11 where it is limited both in frequency and amplitude and applied to a frequency modulator/power amplifier unit 12 to which control data from control unit 13 is also applied. The speech signal is frequency-division multiplexed with the data signal and modulated upon a carrier frequency which is supplied from a frequency synthesizer 14 which is in turn controlled by control unit 13. The carrier frequency is selected so as to tune to a channel having the strongest signal. The modulated carrier is supplied through a duplexer 15 to an antenna 16 for transmission to cell sites which are connected to a mobile telephone switching office. A radio frequency amplifier/mixer unit 17 is coupled to the duplexer 15 to receive a signal from the cell sites to demodulate it into an IF signal, which is amplified by IF amplifier 18. The amplified IF signal is applied to a limiter/discriminator unit 19 and thence to a filter/amplifier unit 20 where the speech signal is separated from the data signal and applied to the handset 10. The data signal is applied to the control unit 13.

The output of IF amplifier 18 is also applied to a logarithmic amplifier 21 to generate a signal indicating the signal strength, or received signal strength indicator (RSSI) for coupling to control unit 13. Control unit 13 directs the frequency synthesizer 14 to scan available channels and examines their RSSI signals to determine the strongest one. As will be described, this channel selection is performed in the process of initialization and at intervals as necessary to keep the portable unit to be constantly tuned to the best channel. A pushbutton dialing set 22 is connected to control unit 13 for entry of dialed digits for origination of calls.

Battery 23 is connected through a manually operated power switch 24 and a battery saving switch 26 to various power drain units of the portable telephone through power line 27. Battery saving switch 26 is responsive to a battery saving (BS) enabling signal supplied from control unit 13 to cut off the power line 27 when battery saving is justified and responsive to the removal of the BS enabling signal to activate the power drain units whenever battery saving is not justified. Control unit 13 constantly receives power from battery 23 through power switch 24 as indicated by a broken-line 25 to prevent various control data from being lost during power saving periods. The RSSI signal from logarithmic amplifier 21 is also applied to a comparator 28 which compares it with a threshold voltage supplied from a voltage source 29. This threshold voltage represents the signal level at the boundary of the service area of a particular portable unit. When the portable telephone is within the service area, the RSSI signal of the best available channel is higher than the boundary threshold and comparator 28 generates a high voltage output. Conversely, when it is outside of the service area, the RSSI signal is lower than the threshold and comparator 28 generates a low voltage output. Control unit 13 responds to the comparator 28 output and generates a BS enabling signal in a manner as herein described with reference to FIGS. 2 to 4.

Figure 2:
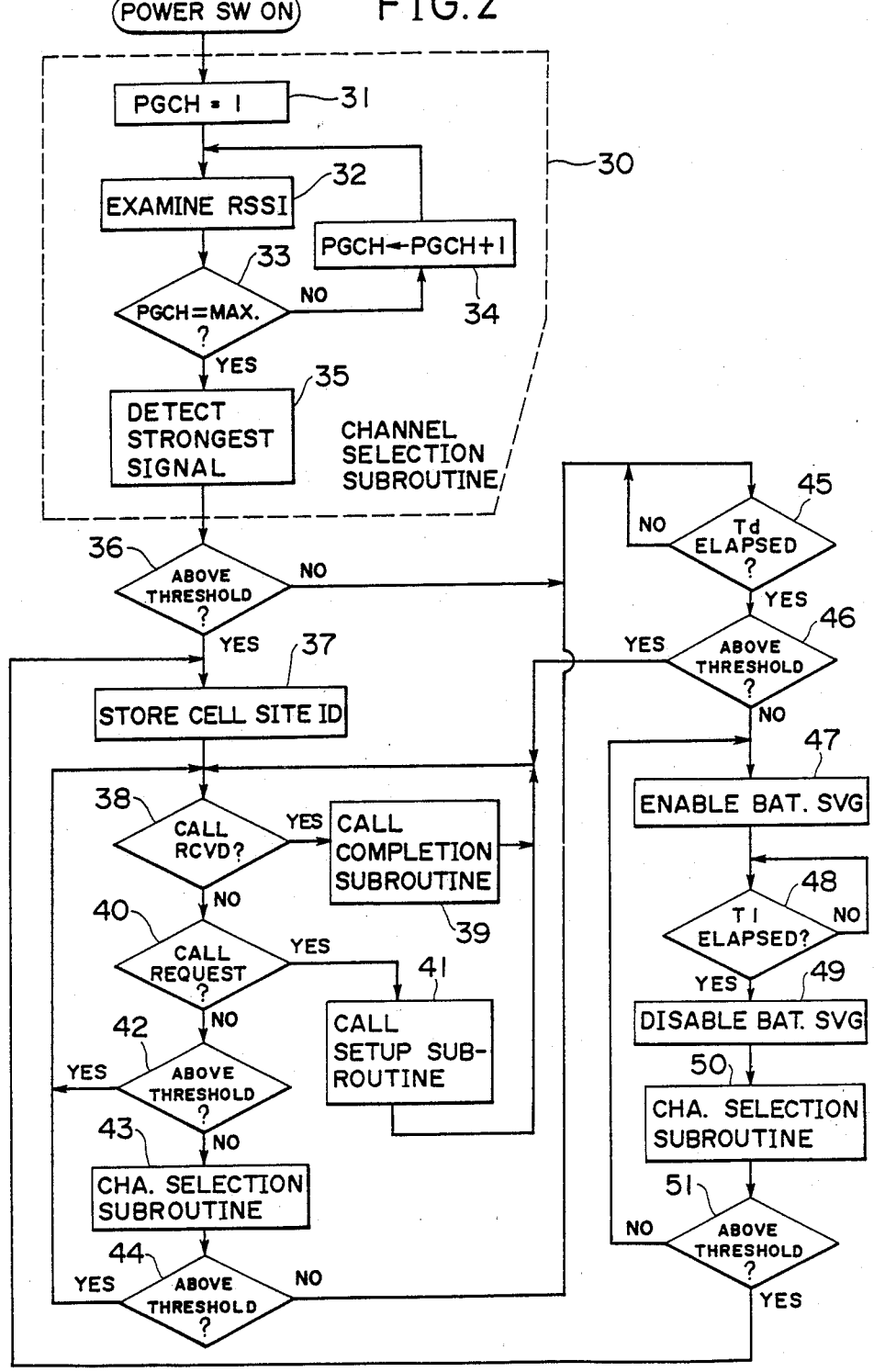
FIG. 2 is a flowchart describing the operation of the control unit of FIG. 1 according to a first embodiment of the invention.

Referring to FIG. 2, program execution begins with an initialization step to perform channel selection subroutine 30 when the portable unit is energized. The channel selection subroutine starts with channel designation block 31 which directs the setting of a paging channel count PGCH equal to 1 so that the frequency synthesizer 14 is controlled to select a first one of available paging channels. Exit is to operations block 32 which directs the detecting of the RSSI value of the selected paging channel. Control proceeds to decision block 33 which detects a match between the PGCH count with a maximum count to determine whether the RSSI values of all the available paging channels have been detected. If the PGCH count is smaller than the maximum, exit is to operations block 34 which directs the incrementing of the PGCH count by 1. Blocks 32, 33 and 34 are repeatedly executed until the RSSI value of the last paging channel is detected, whereupon control proceeds to block 35 which directs the determination of a channel having the strongest RSSI value.

Program execution advances to decision block 36 to check for the presence of a high voltage output from comparator 28 to determine that the portable unit is within the mobile telephone service area. If there is one, control goes to operations block 37 which directs the examining of the cell-site identification received on the selected channel and directs the registration of the cell-site identification into a memory. Exit from operations block 37 is to decision block 38 which checks for the reception of an incoming call, and if there is one, operations block 39 is executed by performing a call completion subroutine in which an access channel is selected for communicating necessary control data to the registered cell site to ring up the portable unit, and a voice channel is selected for establishing a talking connection. At the end of the incoming call, control returns to decision block 38. If the answer at block 38 is negative, control proceeds to decision block 40 which checks for the presence of a request for an outgoing call. Exit then is to operations block 41 which performs a call setup subroutine. In this subroutine, an access channel is selected to send dialed digits to the cell site and a voice channel is selected to establish a talking connection with the cell site. At the end of the outgoing call, control returns to decision block 38. If the answer at block 40 is negative, exit is to decision block 42 which checks for the presence of a high voltage output from the comparator 28. I there is one, exit is to block 38 to repeat the above process, and if there is none, control advances to operations block 43 which performs the channel selection subroutine identical to that performed by the subroutine 30 to seek a new paging channel having the strongest signal. Control proceeds to decision block 44 which checks for the presence of a high voltage output from the comparator 28. If there is one, control recognizes that the portable unit is still located within the service area and returns to block 38.

Figure 5:
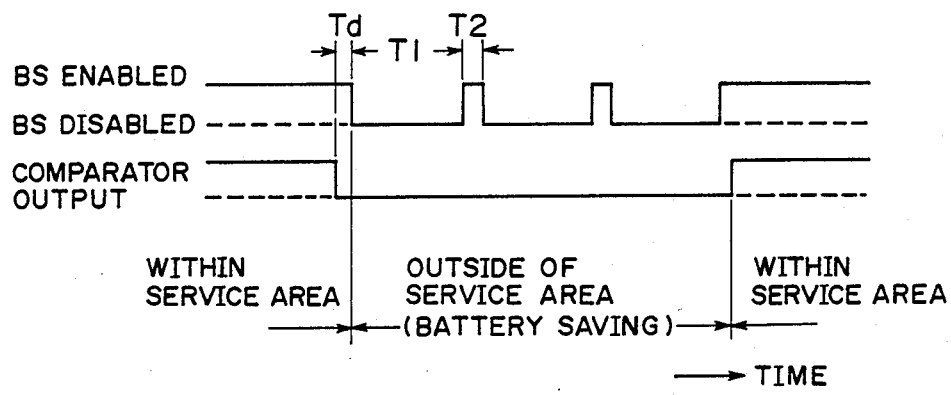
FIGS. 5 to 7 are timing diagrams associated respectively with the first, second and third embodiments.

If the answer is negative in decision blocks 36 and 44, control recognizes that the portable unit is outside of the service area and advances to operations block 45 which directs the introduction of a delay time Td by measuring the amount of time elapsed from the instant the portable unit has crossed the boundary of the service area. Control goes to decision block 46 which checkes for the presence of a high voltage output from the comparator 28. If there is one, control recognizes that the portable unit is returned to the service area and proceeds to block 38. If the answer in block 46 is negative, control recognizes that the portable unit is still outside of the service area and proceeds to operations block 47 which directs the application of a BS enabling signal to the battery saving switch 26. The purpose of the introduction of delay time Td and the threshold decision by execution of blocks 45 and 46 is to discriminate the actual leaving of the portable unit from the service area against false indication of this fact which might occur as a result of short-term variations of signal level. Exit then is to decision block 48 which directs the introduction of a time interval T1 following the execution of block 47 and at the end of time interval T1 control proceeds to block 49 which disables the battery saving by removing the BS enabling signal from the switch 26. Control goes to operations block 50 which directs the execution of the channel selection subroutine and proceeds to decision block 51 to check for the presence of a high voltage output from the comparator 28. If there is none, control recognizes that the portable unit is still outside of the service area and executes blocks 47 through 51 again. If the answer in block 51 is affirmative, control recognizes that the portable unit has reentered to the service area and goes to operations block 37 to update the cell site identification. The time taken to execute blocks 50 and 51 corresponds to an interval T2 during which battery saving is disabled. According to the first embodiment of the invention, the power drain circuits are periodically deactivated as long as the portable unit is outside of the service area and activated continuously when it is within the service area as illustrated in FIG. 5.

Figure 3:
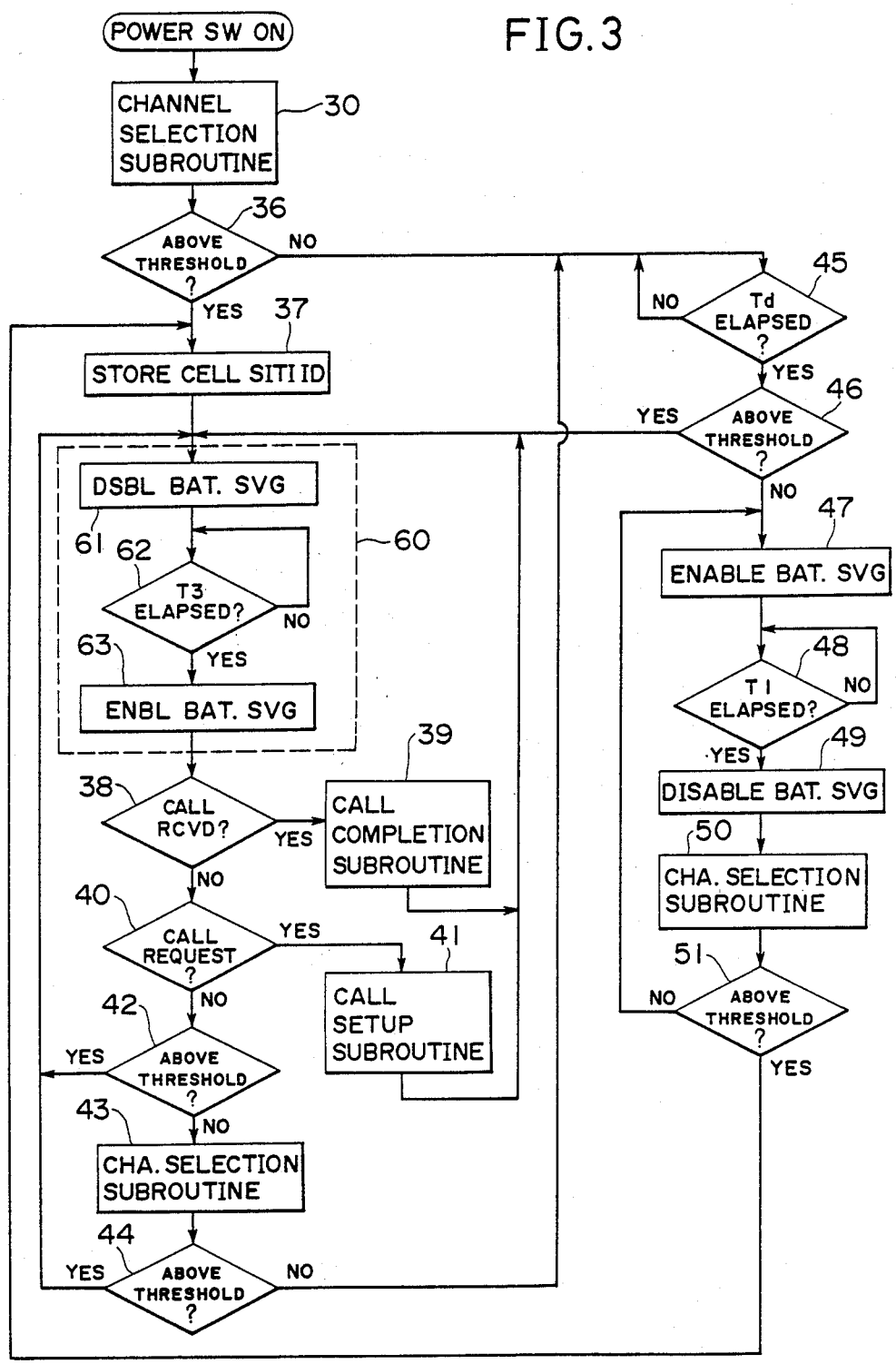
FIG. 3 is a flowchart describing the operation of the control circuit according to a second embodiment.
Figure 6:
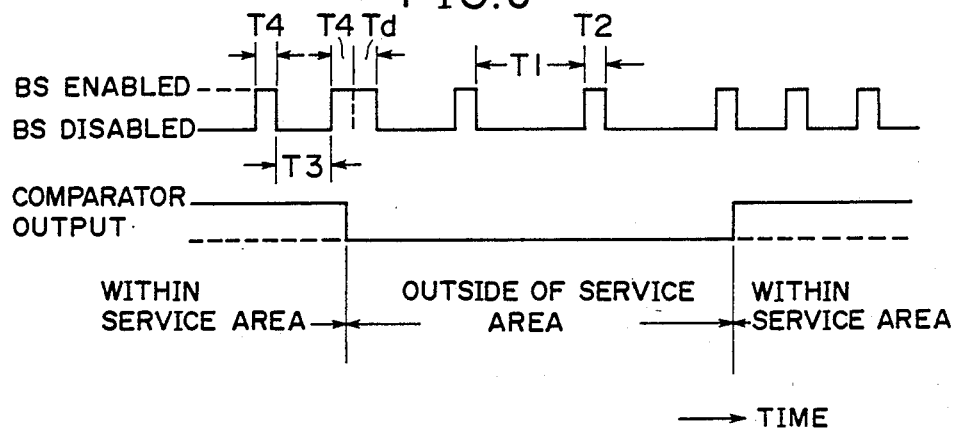

FIG. 3 is a flowchart describing a program according to a second embodiment of the present invention. The second embodiment is a modification of the first embodiment, the difference being the inclusion of a battery saving subroutine 60 between blocks 37 and 38. The battery saving subroutine 60 includes an operations block 61 which directs the application of a BS disabling signal to switch 26, a decision block 62 which introduces a time interval T3 following the disablement of battery saving. Upon determination of T3, control operations proceeds to block 63 which directs the removing of the BS disabling signal from the switch 26 upon the elapse of interval T3. The time interval T3 is shorter than interval T1. Control then executes blocks 38, 40, 42 through 44 and returns to block 61 within an interval T4 to repeat the above process. Thus, the power drain units are repeatedly activated for interval T3 and repeatedly deactivated for interval T4 as long as the portable unit is within the service area while awaiting reception of an incoming call or origination of a call as shown in FIG. 6. While the time interval T4 may vary depending on whether blocks 43 and 44 are executed or not, it remains constant if the signal level remains at a level higher than the boundary threshold. The battery saving subroutine 60 is also performed when the answer in decision block 46 is affirmative.

Figure 4:
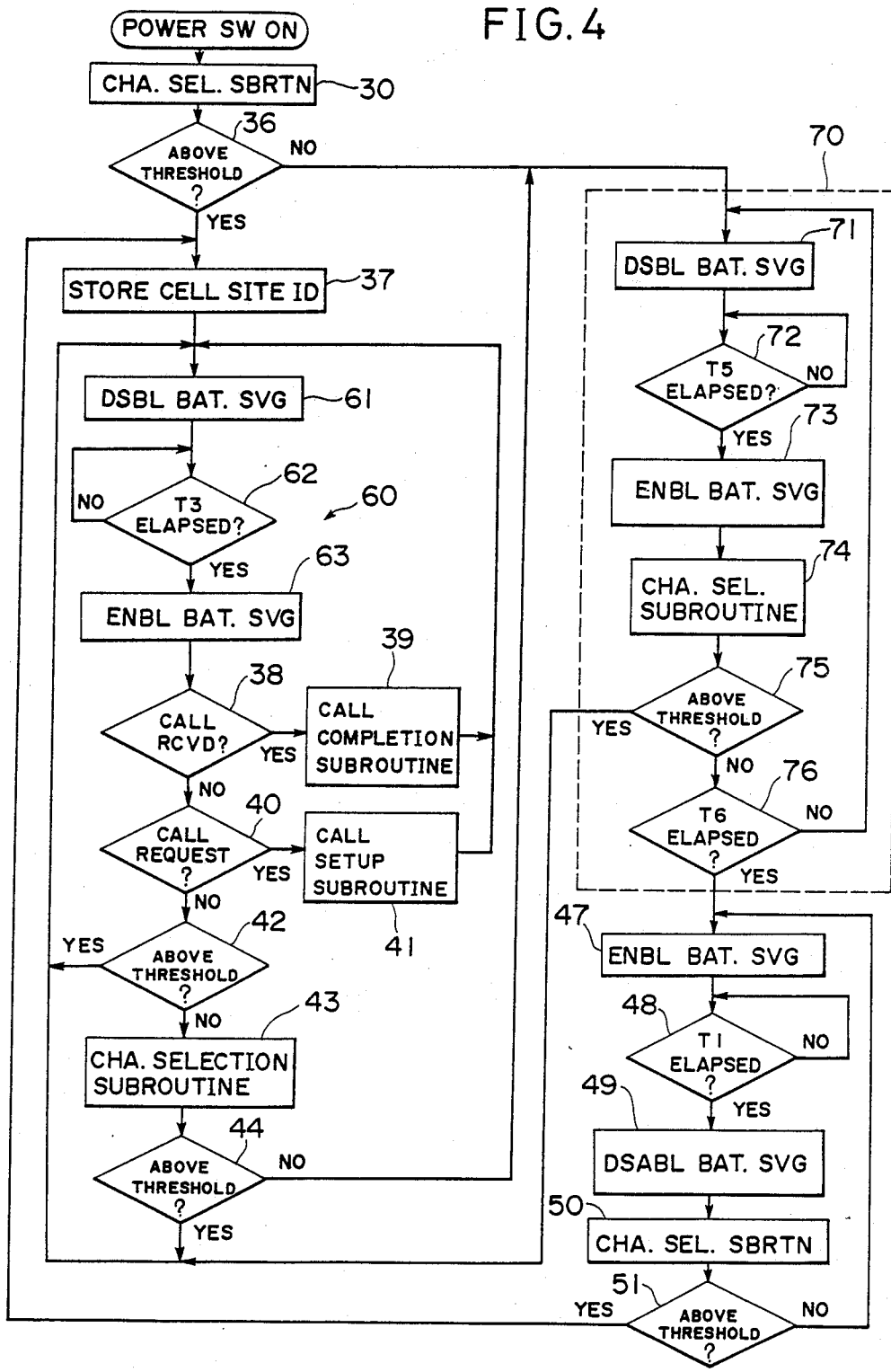
FIG. 4 is a flowchart describing the operation of the control circuit according to a third embodiment.
Figure 7:
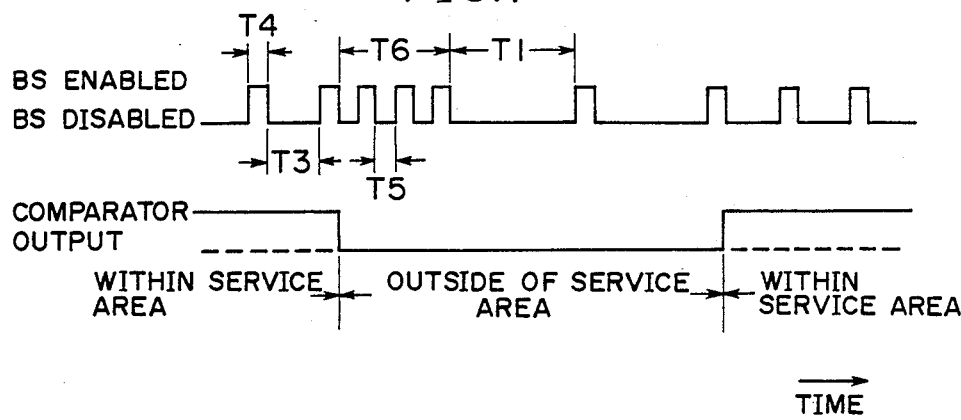

FIG. 4 is a flowchart describing a program according to a third embodiment of the present invention. The third embodiment is a modification of the second embodiment, the difference being the inclusion of a transition subroutine 70 prior to the execution of block 47. The purpose of transition subroutine 70 is to prevent short-term signal level reductions from giving a false indication that the portable unit is leaving the service area in a manner similar to blocks 45 and 46 of FIG. 2. Transition subroutine 70 begins with operations block 71 which directs the disabling of battery saving. Exit then is to decision block 72 which introduces a time interval T5 and then to operations block 73 which directs the enabling of the battery saving. The channel selection subroutine is executed in block 74, followed by a decision block 75 which checks to see if the RSSI value of the channel selected in block 74 is higher than the boundary threshold. If the level reduction is a transitory event, the answer will be affirmative and control returns to block 61. If the level reduction is continued, the answer will be negative and control proceeds to decision block 76 to check to see if a transition interval T6 is elapsed. If T6 is not elapsed, control executes blocks 71 to 76 again. The power drain units are thus periodically deactivated during the transition period T6. Upon the termination of the interval T6, control exits to block 47 to effect battery saving at intervals T1 (see FIG. 7).

The foregoing description shows only preferred embodiments of the present invention. Various modifications are apparent to those skilled in the art without departing from the scope of the present invention which is only limited by the appended claims.

What is claimed is:

1. A battery-powered radio communication unit for use in a mobile telecommunication network covering a service area which is divided into a plurality of cells. each having a cell site, comprising:
    means for receiving signals from the cell sites and generating signals indicating respective strengths of the received signals;
    processing means for detecting the strongest signal from said received signals in accordance with said strength indicating signals, comparing the detected strongest signal with a threshold corresponding to a signal strength at the boundary of said service area and generating a first output indicating that said portable radio communication unit is outside of said service area when said strongest signal is lower than said threshold or a second output indicating that said portable radio communication unit is inside of said service area when said strongest signal is higher than said threshold; and
    battery saving means responsive to said first output for periodically interrupting the power supplies to power consuming portions of said communication unit.

2. A battery-powered portable radio communication unit as claimed in claim 1, wherein said processing means introduces a time interval in response to a first occurrence of said first output and repeats said comparison upon termination of said time interval to generate a second occurrence of said first output when said strongest signal is still lower than said threshold, and wherein said battery saving means responds to the second occurrence of said first output by periodically interrupted said power supplies.

3. A battery-powered portable radio communication unit as claimed in claim 1, wherein said battery saving means is responsive to said second output for periodically interrupting said power supplies when said communication unit is in a standby mode.

4. A battery-powered portable radio communication unit as claimed in claim 3, wherein the intervals at which said power supplies are periodically interrupted in response to said second output are smaller than the intervals at which the power supplies are periodically interrupted in response to said first output.

5. A battery-powered portable radio communication unit as claimed in claim 3, wherein said battery saving means periodically interrupts said power supplies during a prescribed time duration in response to a transition from said second output to said first output and wherein the intervals at which said power supplies are periodically interrupted during said prescribed time duration being smaller than the intervals at which said power supplies are periodically interrupted in response to said second output.

6. A method for saving the battery power of a portable communication unit for use in a mobile telecommunication network covering a service area, said service area being divided into cells having cell sites, comprising the steps of:
    (a) receiving signals from said cell sites, generating signals indicating respective strengths of the received signals and selecting the strongest signal from said received signals in accordance with said strength indicating signals;
    (b) determining whether said selected strongest signal is higher or lower than a threshold corresponding to a signal strength at the boundary of said service area;
    (c) if said strongest signal is determined as being lower than said threshold, interrupting power supplies to power consuming portions of said communication unit during a prescribed duration and then repeating the steps (a) and (b); and
    (d) if said strongest signal is determined as being higher than said threshold, repeating the steps (a) and (b).

7. A method as claimed in claim 6, further comprising the steps of introducing a time interval between the steps (b) and (c) and repeating the step (b) at the end of said introduced time interval prior to the step (c).

8. A method as claimed in claim 6, wherein the step (d) comprises the step of interrupting said power supplies for a second prescribed duration if said strongest signal is determined as being higher than said threshold prior to repeating the steps (a) and (b).

9. A method as claimed in claim 8, wherein said second prescribed duration is smaller than the first-mentioned prescribed duration.

10. A method as claimed in claim 9, wherein the step (c) comprises:
    (1) interrupting said power supplies for a third prescribed duration smaller than said second prescribed duration; and
    (2) repeating the steps (a), (b) and (c) for a predetermined duration prior to the interruption of the power supplies for the prescribed during of step (c).

* * * * *